US011647763B2

(12) United States Patent
Leenhouts et al.

(10) Patent No.: US 11,647,763 B2
(45) Date of Patent: May 16, 2023

(54) PROCESS FOR THE MANUFACTURE OF EDIBLE WATER-IN-OIL EMULSIONS

(71) Applicant: UPFIELD EUROPE B.V., Rotterdam (NL)

(72) Inventors: Abraham Leenhouts, Vlaardingen (NL); Irene Erica Smit-Kingma, Vlaardingen (NL); Farley Ferdinand Tio, Vlaardingen (NL)

(73) Assignee: UPFIELD EUROPE B.V., Rotterdam (NL)

( * ) Notice: Subject to any disclaimer, the term of this patent is extended or adjusted under 35 U.S.C. 154(b) by 1086 days.

(21) Appl. No.: 14/762,024

(22) PCT Filed: Nov. 15, 2013

(86) PCT No.: PCT/EP2013/073969
§ 371 (c)(1),
(2) Date: Jul. 20, 2015

(87) PCT Pub. No.: WO2014/117883
PCT Pub. Date: Aug. 7, 2014

(65) Prior Publication Data
US 2015/0320068 A1 Nov. 12, 2015

(30) Foreign Application Priority Data

Jan. 31, 2013 (EP) ..................................... 13153475

(51) Int. Cl.
*A23D 7/005* (2006.01)
*A23D 7/02* (2006.01)
*A23D 7/01* (2006.01)

(52) U.S. Cl.
CPC ......... *A23D 7/0053* (2013.01); *A23D 7/0056* (2013.01); *A23D 7/01* (2013.01); *A23D 7/011* (2013.01); *A23D 7/013* (2013.01); *A23D 7/02* (2013.01)

(58) Field of Classification Search
CPC .................................................. A23D 7/0053
USPC ....................................................... 426/602
See application file for complete search history.

(56) References Cited

U.S. PATENT DOCUMENTS

| 3,917,859 | A | * | 11/1975 | Terada | A23D 7/011 |
| | | | | | 426/585 |
| 4,943,389 | A | * | 7/1990 | Weete | A23J 7/00 |
| | | | | | 426/662 |
| 5,453,523 | A | * | 9/1995 | Weete | C07F 9/103 |
| | | | | | 554/10 |
| 6,017,388 | A | | 1/2000 | Yuan | |
| 2012/0018535 | A1 | * | 1/2012 | Wubbolts | A61K 8/046 |
| | | | | | 239/310 |

FOREIGN PATENT DOCUMENTS

| EP | 0347006 | 12/1989 | |
| EP | 1795257 | 6/2007 | |
| EP | 1651338 | 5/2011 | |
| WO | WO9614755 | 5/1996 | |
| WO | WO2005014158 | 2/2005 | |
| WO | WO2006087091 | 8/2006 | |
| WO | 2013056964 | * 4/2013 | ............... A23D 7/04 |

OTHER PUBLICATIONS

Baker, Maximizing the Use of Food Emulsifiers, 1997 Food Science, Kansas State University accessed at http://citeseerx.ist.psu.edu/viewdoc/download?doi=10.1.1.841.2927&rep=rep1&type=pdf (Baker) (Year: 2010).*
Experimental and Analytical Facilities, Delft University of Technology, Dec. 16, 2005, pp. 41-51.
IPRP in PCTEP2013073969, May 14, 2014.
Margarines and Shortenings, Ullmanns Encyclopedia of Industrial Chemistry, 1990, pp. 156-158, vol. A16.
Marszall, Leszek, Messungen des effektiven HLB-Wertes nichtionogener Tenside mittels Phenol-Titrationsmethode, Parfumerie und Kosmetik, 1979, pp. 444-448, vol. 60.
Neumuller, Franck'sce Verlagshandlung, Stuttgart, Rompps Chemie-Lexikon, 1983, pp. 1750-1751, 8th Edition.
P. Munuklu, Particle formation of edible fats using the supercritical melt micronization process (ScMM), The Journal of Supercritical Fluids, 2007, pp. 181-190, 43.
Pernille Gerstenberg Kirkeby, Margarine and Dairy Spreads: Processing and Technology, Handbook of Food Products Manufacturing, 2007, pp. 703-724.
Search Report in EP13153475, dated Aug. 14, 2013.
Search Report in PCTEP2013073969, dated Jan. 9, 2014.
Written Opinion in EP13153475, dated Aug. 14, 2013.
Written Opinion in PCTEP2013073969, dated Jan. 9, 2014.
Examination Report, India Patent Office, dated Nov. 28, 2018.

* cited by examiner

Primary Examiner — Amber R Orlando
Assistant Examiner — Philip A Dubois
(74) Attorney, Agent, or Firm — Arentfox Schiff LLP

(57) ABSTRACT

The invention relates to a process to manufacture a water-in-oil emulsion, comprising •10 to 85 wt. % of liquid oil; •0.5 to 50 wt. % of fat powder comprising hardstock fat; •10 to 85 wt. % of a water-phase; •0.005 to 5 wt. % of lecithin; and •0.01 to 5 wt. % of monoglyceride; comprising the steps of: 1. providing a solution of at most 5 wt. % of the liquid oil, based on the total amount of liquid oil, comprising at least 50 wt. % of dissolved lecithin, based on total amount of lecithin; and at least 50 wt. % of dissolved monoglyceride, based on total amount of monoglyceride; wherein the temperature of the solution is at least 50 degrees Celsius; 2. providing an oil-continuous system comprising at least 75 wt. % of the liquid oil, based on the total amount of liquid oil, wherein the system has a temperature of from 0 to 20 degrees Celsius; 3. contacting the solution provided at step '1' with the system provided at step '2'; 4. mixing the mixture provided at step '3' to provide a water-in-oil emulsion; wherein any remaining ingredients are added whole at step '2', step '3' or step '4' or added in parts in any combination at step '2', step '3' and step '4'. The process of the invention results in water-in-oil emulsions with an improved stability and a reduced batch-to-batch variation in stability.

20 Claims, No Drawings

PROCESS FOR THE MANUFACTURE OF EDIBLE WATER-IN-OIL EMULSIONS

FIELD OF INVENTION

The present invention relates to a process for the manufacture of edible water-in-oil emulsions. Furthermore, the invention relates to an oil-continuous system comprising emulsifier particles.

BACKGROUND OF INVENTION

Edible water-in-oil emulsions (W/O emulsions) like e.g. margarine and low fat spreads are well known food products that comprise a continuous fat-phase and a dispersed water-phase.

Margarine is generally defined as a composition containing at least 80 wt. % of fat and about 20 wt. % of a water-phase. In contrast, emulsions containing less than 80 wt. % of fat are generally called spreads. Nowadays the terms margarine and spread are often used interchangeably although in some countries the commercial use of the term margarine is subject to certain regulatory requirements. The main difference between margarine and spread is the amount of fat. For the purpose of the present invention the terms margarine and spread are used interchangeably.

The fat-phase of margarine and similar edible W/O emulsions comprise a mixture of liquid oil (i.e. fat that is liquid at ambient temperature) and fat which is solid at ambient temperature. The liquid oil fraction typically comprises liquid unmodified vegetable oil such as soybean oil, sunflower oil, linseed oil, low erucic rapeseed oil (Canola), corn oil (maize oil) and blends of vegetable oils. The solid fat, also called structuring fat or hardstock fat, serves to structure the fat-phase by forming a fat crystal network throughout the continuous oil-phase. It also helps to stabilize the emulsion. The droplets of the water-phase are fixed within the spaces of the lattice of solid fat crystals. This prevents coalescence of the droplets and separation of the heavier water-phase from the fat-phase.

A general process for the manufacture of water-in-oil emulsions is the votator or churn process, which encompasses the following steps:

1. Mixing of the liquid oil, the hardstock fat and if present the water-phase at a temperature at which the hardstock fat is definitely liquid;
2. cooling of the mixture under high shear to induce crystallization of the hardstock fat to create an emulsion;
3. formation of a fat crystal network to stabilize the resulting emulsion and give the product some degree of firmness;
4. modification of the crystal network to produce the desired firmness, confer plasticity and reduce the water droplet size.

These steps are usually conducted in a process that involves apparatus that allow heating, cooling and mechanical working of the ingredients, such as the churn process or the votator process. The churn process and the votator process are described in the Ullmans Encyclopedia, Fifth Edition, Volume A 16, pages 156-158.

Stability is an important quality-aspect of edible water-in-oil emulsions, for example consumers expect the W/O emulsions to be stable during storage and when subjected to temperature cycling. Temperature cycling means that the product is subjected to low and high temperatures (e.g. when the consumer takes the product out of the refrigerator and leaves it for some time on the table prior to use). There is a continuing need to improve the stability of water-in-oil emulsions.

Stable W/O emulsions can be characterized by little or no increase in the average water droplet size and/or droplet size distribution during storage and after temperature cycling. For some type of W/O emulsions, such as spreads, good stability may also be indicated by little or no deterioration in hardness (e.g. Stevens value) and/or in spreadability during storage and after temperature cycling.

Pernille et. al. 'Handbook of food products manufacturing', chapter 31, disclose that in a votator process emulsifiers may be used to stabilize the liquid emulsion before crystallization of the hardstock fat to secure a homogeneous product and provide a fine and stable water distribution in margarine and spreads.

An alternative approach to improve the stability of W/O emulsions is the use of hardstock fat in the form fat powder (i.e. pre-crystallized hardstock fat). The use of fat powder also allows a reduction in SAFA (saturated fatty acids) and makes a broader range of fat suitable as hardstock fat.

WO 2005/014158 discloses a process for the preparation of edible water-in-oil emulsions, using fat powder.

The general process for the manufacture of W/O emulsions using fat powder comprising pre-crystallized hardstock fat encompasses the following steps:

a. mixing of fat powder and (cold) liquid oil to provide a slurry;
b. providing a water-phase;
c. mixing the slurry and the water-phase to form a fat-continuous emulsion, wherein the fat-powder is typically not subjected to a temperature at which the fat powder will substantially melt. Such a process to manufacture W/O emulsions is also disclosed in WO2006/087091, which use besides fat powder, a combination of monoglyceride and lecithin.

It was found that when emulsifiers are used in a factory scale process to manufacture W/O emulsions using fat powder to improve stability, the stability increase can be poor and the stability may vary considerably from batch to batch.

There is a need for a process to manufacture W/O emulsions using fat powder with an improved stability.

There is a need for a (factory scale) process to manufacture W/O emulsions using fat powder with reduced batch-to-batch variation in stability.

SUMMARY OF THE INVENTION

One or more of the above needs is met by a process to manufacture a water-in-oil emulsion, comprising 10 to 85 wt. % of liquid oil;
0.5 to 50 wt. % of fat powder comprising hardstock fat;
10 to 85 wt. % of a water-phase;
0.005 to 5 wt. % of lecithin; and
0.01 to 5 wt. % of monoglyceride;

comprising the steps of:

1. providing a solution of at most 5 wt. % of the liquid oil, based on the total amount of liquid oil, comprising at least 50 wt. % of dissolved lecithin, based on total amount of lecithin; and at least 50 wt. % of dissolved monoglyceride, based on total amount of monoglyceride; wherein the temperature of the solution is at least 50 degrees Celsius;

2. providing an oil-continuous system comprising at least 75 wt. % of the liquid oil, based on the total amount of liquid oil, wherein the system has a temperature of from 0 to 20 degrees Celsius;
3. contacting the solution provided at step '1' with the system provided at step '2';
4. mixing the mixture provided at step '3' to provide a water-in-oil emulsion;

wherein any remaining ingredients are added whole at step '2', step '3' or step '4' or added in parts in any combination at step '2', step '3' and step '4'.

It was found that adding lecithin and monoglyeride, in the form of a (concentrated) solution of dissolved lecithin and dissolved monoglyceride, to the relatively cold oil results in W/O emulsions with an improved stability. For example, the W/O emulsions produced show an reduced average droplet size (e.g. smaller D3,3), reduced droplet size distribution (e.g. smaller e-sigma), a good spreadability and an improved Stevens value. In addition the batch-to-batch variation in stability of the produced water-in-oil emulsions was significantly reduced, which was particularly noticeable when the process was implemented on pilot-scale and/or factory scale. In contrast, for example:

- addition of dissolved lecithin at a separate time and/or place as the dissolved monoglyceride (i.e. as two separate solutions);
- providing a solution of lecithin and monoglyceride in a large amount of oil, such as 20 wt. % of the liquid oil;
- addition of the solution provided at step '1' to a water-continuous system at step '2';
- addition of the solution provided at step '1' to an oil-continuous system which has a temperature of above 20 degrees Celsius (e.g. 25 degrees Celsius);

leads to W/O emulsions with a reduced stability and/or an increased batch-to-batch variability in stability.

It was observed that contacting the solution of step '1' to the oil-continuous system at step '3' leads to distinct average volume size distribution of particles comprising crystallized emulsifier. It is observed that the use of such an oil-continuous system improves W/O emulsion stability, and reduces the batch-to-batch variability in stability.

Therefore the invention also relates to an edible oil-continuous system comprising emulsifier particles comprising crystallized lecithin, monoglyceride or a combination thereof, wherein at least 23% of the total volume of said particles is derived from particles having a diameter of at most 1 micrometer (μm).

DETAILED DESCRIPTION OF THE INVENTION

Weight percentage (wt. %) is based on the total weight of product, unless otherwise stated. It will be appreciated that the total weight amount of ingredients used in the process according to the invention will not exceed 100 wt. % of the total weight of the W/O emulsion made with said process.

The terms 'fat' and 'oil' are used interchangeably. Where applicable the prefix 'liquid' or 'solid' is added to indicate if the fat or oil is liquid or solid at ambient temperature as understood by the person skilled in the art. Ambient temperature is a temperature of about 20 degrees Celsius.

Hardstock fat refers to a fat that is solid at ambient temperature as understood by the person skilled in the art.

The terms 'water-in-oil emulsion' and 'W/O emulsion' are used interchangeably.

Emulsifiers

Typically fat soluble emulsifiers are used to in the manufacture of water-in-oil emulsions, whereas water soluble emulsifiers are typically used to improve the stability of oil-in-water emulsions, such as dressings. The Hydrophilic-Lipophilic Balance (HLB) of an emulsifier is a measure of the degree to which it is hydrophilic or lipophilic. The HLB value is a parameter which is describing the solubility of the surfactant. The HLB value is a concept introduced by Griffin in 1950 as a measure of the hydrophilicity or lipophilicity of nonionic surfactants. It can be determined experimentally by the phenol titration method of Marszall; see "Parfumerie, Kosmetik", Vol. 60, 1979, pp. 444-448; and Rompp, Chemistry Lexicon, 8th Edition 1983, p. 1750. An emulsifier having an HLB value of 8 or lower is usually classified as being a water-in-oil promoting emulsifier and as fat soluble. Emulsifiers with an HLB of more than 8 are oil-in-water promoting.

Lecithin

Lecithin is a collective name of products which consist of a few well-defined substances and many more or less well-defined substances in varying amounts. Common non-purified lecithin (crude lecithin) typically consists of about one half or more of phospholipids. Other substances present in crude lecithin are fats (typically about 35 wt. %), free fatty acids, glycolipids, tocopherols, sterols and carbohydrates.

Preferably in the process according to the invention the amount of lecithin used is from 0.01 to 3 wt. %, more preferably from 0.02 to 1 wt. %, even more preferably form 0.03 to 0.5 wt. % and still even more preferably from 0.05 to 0.25 wt. %.

Most commercially available lecithins are prepared on the basis of soybeans, but lecithin is also found inter alia in animal sources, such as yolk and other vegetable sources, such as in rapeseed and sunflower oil.

Preferably the lecithin used in the process according to the invention is derived from a vegetable source, more preferably soybeans, sunflower seeds or rapeseed or any a combination thereof; and even more preferably from sunflower seeds.

Lecithin may be treated, such as by hydrogenation or hydrolysation, to alter the HLB-value. It was found that use of a lecithin in the process of the invention with a HLB value of from 8 to 16 improved the stability of the W/O emulsions made and reduced batch-to-batch variation in stability.

Preferably the HLB value of the lecithin used in the process according to the invention is from 8 to 16, more preferably from 10 to 14.

The phospholipids consist of glycerol with fatty acids bound in positions 1 and 2 and with phosphoric acid bound in position 3. The phosphoric acid moiety may in turn have bound to it another substance which is important in naming the phospholipid. The primary phospholipids which are typically found in lecithin are:

Diglycerides of fatty acids linked to a choline ester of phosphoric acid (phosphatidylcholine); linked to ethanlamine ester of phosphoric acid (phosphatidylethanolamine) or linked to an inositol ester of phosphoric acid (phosphatidylinositol).

Preferably the lecithin used in the process according to the invention comprises at least 25 wt. %, more preferably at least 35 wt. % and even more preferably at least 45 wt. % of phosphatidylcholine, phosphatidylethanolamine or phosphatidylinositol or any combination thereof, based on the total weight of the lecithin.

Preferably the lecithin used in the process according to the invention comprises at least 30 wt. %, more preferably at least 50 wt. %, even more preferably at least 60 wt. %, still even more preferably at least 70 wt. % and still even more preferably at least 80 wt. % of phosphatidylcholine, based on the weight of total lecithin.

Use of lecithin comprising more phosphatidylcholine is believed to result in more stable W/O emulsions and to further reduce batch-to-batch variation in stability.

Lecithin according to the invention is commercially available, for example under the trade name Bolec Z T, Cetinol, Sunlec Z, or Sunlec M, which are commercially available from (Unimills B. V., the Netherlands).

Preferably the lecithin used in the process according to the invention is Bolec ZT, Cetinol, Sunlec Z or Sunlec M, or any combination thereof; and more preferably is Sunlec M.

Monoglyceride

Monoglycerides are molecules comprising a glycerol moiety esterified to a single fatty acid residue. Generally monoglycerides can be characterized by the tail-length and the degree of unsaturation of their fatty acid residue.

Preferably the amount of monoglyceride used in the process according to the invention is from 0.01 to 3 wt. %, more preferably from 0.02 to 1 wt. %, even more preferably from 0.03 to 0.5 wt. % and still even more preferably from 0.05 to 0.3 wt. %.

The monoglyceride used in the process of the invention may be a single type or a mixture of different types of monoglyceride.

Preferably the average tail-length of the fatty-acid residue of the monoglyceride used in the process according to the invention is from C8 to C22, more preferably from C12 to C20 and even more preferably from C14 to C18.

Preferably the monoglyceride used in the process according to the invention comprises from to 90 wt. %, more preferably from 30 to 85 wt. %, even more preferably from 40 to 80 wt. % and still even more preferably from 50 to 75 wt. % of saturated fatty acid residues, based on the total weight of the monoglyceride.

Monoglycerides according to the invention are commercially available, for example under the trade name Dimodan HP (98 wt. % of saturated fatty acid residues; Supplier: Danisco), Dimodan RT (20 wt. % of saturated fatty acid residues; Supplier: Danisco) or Dimodan U/J (15 wt. % of saturated fatty acid residues; Supplier: Danisco).

Preferably the monoglyceride used in the process according to the invention comprises Dimodan HP, Dimodan RT or Dimodan U/J or any combination thereof and more preferably comprises a combination of dimodan HP and Dimodan RT.

Liquid Oil

The liquid oil used in the process according to the invention according to the invention may be a single oil or a mixture of different oils. Preferably at least 50 wt. % of the oil, based on total amount of oil, more preferably at least 60 wt. %, even more preferably at least 70 wt. %, still more preferably at least 80 wt. %, even still more preferably at least 90 wt. % and even still more further preferably at least 95 wt. %, is of vegetable origin. Most preferably the oil essentially consists of oil of vegetable origin. The liquid oil fraction preferably comprises unmodified vegetable oil such as soybean oil, sunflower oil, linseed oil, low erucic rapeseed oil (Canola), corn oil (maize oil), olive oil, algae oil and blends of vegetable oils. For the purpose of this invention algae oil is considered vegetable oil.

Preferably in the process according to the invention 12 to 60 wt. %, more preferably 15 to 45 wt. % even more preferably 17 to 35 wt. % and still even more preferably 20 to 30 wt. % of liquid oil is used.

Water-Phase

The water-phase is prepared according to the standard way in accordance with the chosen ingredients. The water-phase used in the process according to the invention may suitably contain a variety of food grade ingredients, such as sodium chloride, acidulant, preservative, water-soluble flavoring, polysaccharides, minerals and water-soluble vitamins. The water-phase may also comprise (a small amount off) liquid oil, for example to aid the inclusion of hydrophobic ingredients in the water-phase. The water-phase may also comprise proteins and non-gelling proteins, like for example dairy proteins. The water-phase may also comprise gelling and/or thickening agents like for example starches, vegetable gums, pectin and proteins suitable for such use like gelatine.

Preferably the water-phase comprises from 0.5 to 4, more preferably from 1 to 3 and even more preferably from 1.5 to 2 wt. % of salt based on the weight of the water-phase.

Preferably the pH of the water-phase is acidic and more preferably is from 3 to 5 and even more preferably from 3.5 to 4.5.

Preferably in the process according to the invention 40 to 80 wt. %, more preferably 50 to 78 wt. % and even more preferably 65 to 75 wt. % of water-phase is used.

Fat Powder

The fat powder comprises hardstock fat and preferably comprises at least 80 wt. % of hardstock fat, more preferably at least 85 wt. %, even more preferably at least 90 wt. %, even more preferably at least 95 wt. % and even more preferably at least 98 wt. %. Still even more preferably the edible fat powder essentially consists of hardstock fat.

The hardstock fat may be a single fat or a mixture of different fats. The hardstock fat may be of vegetable, animal or marine origin. Preferably at least 50 wt. % of the hardstock fat (based on total amount of hardstock fat comprised by the fat powder) is of vegetable origin, more preferably at least 60 wt. %, even more preferably at least 70 wt. %, even more preferably at least 80 wt. %, even more preferably at least 90 wt % and even more preferably at least 95 wt. %. Still even more preferably the hardstock fat essentially consists of hardstock fat of vegetable origin.

The hardstock fat as present in the edible fat powder preferably has a solid fat content N10 from 50 to 100, N20 from 26 to 95 and N35 from 5 to 60; more preferably has a solid fat content N10 from 80 to 100, N20 from 70 to 95 and N35 from 30 to 60; and even more preferably is an interesterified mixture of 65% dry fractionated palm oil stearin with an Iodine Value of 14 and 35% palm kernel oil.

The amount of fat powder used is suitably chosen such that the required structuring (i.e. stable emulsion) is obtained. It will be appreciated that the amount of fat powder depends on the amount of hardstock fat in the fat powder and the desired amount of hardstock fat on total product.

Preferably the amount of fat powder comprising hardstock fat used in the process according to the invention is from 1 to 20 wt. %, more preferably 2 to 15 wt. % and even more preferably 3 to 10 wt. %.

Suitable methods to prepare the fat powder include for example Super Critical Melt Micronisation (ScMM), also known as particles from gas saturated solutions (PGSS). This is a commonly known method and is for example described in J. of Supercritical Fluids 43 (2007) 181-190, EP1651338 and WO2005/014158.

The process according to the invention is especially beneficial when used with fat powder that has been prepared using a ScMM process. Preferably the fat powder used in the process according to the invention is micronized fat powder and more preferably is micronized fat powder obtainable by supercritical melt micronisation.

It is important that the fat powder is not subjected to temperatures at which the structuring fat melts as this severely reduces the ability to structure. This temperature depends on the structuring fat used and can routinely be determined for example based on the solid fat content profile (i.e. N-lines) of the structuring fat. Preferably the fat powder, after production, has not been subjected to temperatures above 25 degrees Celsius.

Total Fat-Level

The process according to the invention improves the stability and reduces batch-to-batch variation in stability of the W/O emulsions manufactured compared to prior art processes.

Suitably the improved stability of the W/O emulsion produced according to the process according of the invention can be used to reduce the saturated fatty acids and/or total fat content.

Preferably in the process according to the invention the amount of total fat used is from 15 to 50 wt. %, more preferably from 20 to 40 wt. % and even more preferably from 25 to 35 wt. %.

Preferably the W/O emulsion made according to the process of the invention is a liquid margarine, a wrapper or a spread, more preferably a spread and even more preferably a low-fat spread comprising from 25 to 35 wt. % of total fat.

Providing the Solution of Lecithin and Monoglyceride at Step 1

In the process according to the invention at step '1' is provided a solution of at most 5 wt. % of the liquid oil, based on the total amount of liquid oil, comprising at least 50 wt. % of dissolved lecithin, based on total amount of lecithin; and at least 50 wt. % of dissolved monoglyceride, based on total amount of monoglyceride; wherein the temperature of the solution is at least 50 degrees Celsius.

The purpose of providing said solution at an elevated temperature of at least 50 degrees Celsius is to substantially, preferably completely dissolve (e.g. melt) the lecithin and monoglyceride.

Preferably the temperature of the solution provided at step '1' is at least 55 degrees Celsius, more preferably at least 65 degrees Celsius and even more preferably from 70 to 95 degrees Celsius.

Preferably the solution at step '1' is not heated to excessive temperatures and preferably is heated to at most 250 degrees Celsius, more preferably at most 200 degrees Celsius and even more preferably at most 150 degrees Celsius.

Preferably at least 65 wt. %, more preferably at least 75 wt. %, even more preferably at least 85 wt. %, based on the total amount of lecithin, and still even more preferably essentially all the lecithin is comprised by the solution provided at step '1'.

Preferably at least 65 wt. %, more preferably at least 75 wt. %, even more preferably at least 85 wt. %, based on the total amount of monoglyceride, and still even more preferably essentially all the monoglyceride is comprised by the solution provided at step '1'.

Preferably the ratio of lecithin:monoglyceride in the process according of the invention, and more preferably of the solution provided at step '1', is from 1:8 to 8:1, more preferably from 1:5 to 5:1 and even more preferably from 1:3 to 3:1.

The amount of liquid oil present in the solution at step '1' is at most 5 wt. % of the total amount of liquid oil.

Preferably the amount of liquid oil in the solution provided at step '1' is at most 4.5 wt. %, more preferably at most 4 wt. %, even more preferably at most 3.5 wt. % and still even more preferably at most 3 wt. %, based on the total amount of liquid oil. Suitably the solution at step '1' comprises little or no oil (i.e. below 1 wt. %). A smaller amount of liquid oil comprised by the solution provided at step '1' further improves the stability and reduces the batch-to-batch variation in stability of the produced W/O emulsions.

Preferably the concentration of lecithin in the solution provided at step '1' is from 5 to 75 wt. %, more preferably from 10 to 45 wt. % and even more preferably from 15 to 35 wt. %, based on the total weight of the solution.

Preferably the concentration of monoglyceride in the solution provided at step '1' is from 5 to 75 wt. %, more preferably from 10 to 45 wt. % and even more preferably from 15 to 30 wt. %, based on the total weight of the solution.

A higher concentration of lecithin and/or monoglyceride in the solution provided at step '1' further improves the stability and reduces the batch-to-batch variation in stability of the produced W/O emulsions.

The at least 50 wt. % of dissolved lecithin and at least 50 wt. % of dissolved monoglyceride provided in the solution at step '1' should be in a dissolved state at least (i.e. just before) contacting the oil-continuous system at step '3' of the process according to the invention. For example, the solution provided at step '1' may be kept at a temperature of at least 50 degrees Celsius up to the moment of said contact.

Providing an Oil-Continuous System at Step '2'

At step '2' in the process according to the invention an oil-continuous system is provided comprising at least 75 wt. % of liquid oil, based on the total weight of liquid oil, with a temperature of from 0 to 20 degrees Celsius.

Preferably the oil-continuous system provided at step '2' comprises at least 80 wt. %, preferably at least 85 wt. %, more preferably at least 90 wt. % and even more preferably at least 95 wt. % of the liquid oil, based on the total amount of liquid oil.

The oil-continuous system may essentially consist of liquid oil or may further comprise additional ingredients. For example, the oil-continuous system at step '2' may comprise part or all of the water-phase and/or part or all of the fat powder comprising hardstock fat.

Preferably the oil-continuous system provided at step '2' comprises of at least 75 wt. %, more preferably at least 85 wt %, even more preferably at least 95 wt. % of liquid oil, based on the total weight of the oil-continuous system, and still even more preferably essentially consists of liquid oil.

When increasing amounts of water-phase are added to the oil-continuous system at step '2' care should be taken to maintain the system in an oil-continuous state at least until after contact at step '3' with the solution provided at step '1'. For example, the risk of inversion to a water-continuous state of the oil-continuous system provided at step '2' can be reduced by reducing the amount of water added at step '2'. Preferably at least 25 wt. %, more preferably at least 50 wt. %, even more preferably at least 60 wt. %, based on the total amount of water-phase, and even more preferably essentially all of the water-phase is added at step '4' of the process according to the invention.

Preferably the oil-continuous system, provided at step '2' comprises at most 75 wt. %, more preferably at most 50 wt. %, even more preferably at most 40 wt. %, still even more preferably at most 25 wt. % and still even more preferably at most 10 wt. % of the water-phase, based on the total amount of water-phase.

Preferably the temperature of the oil-continuous system provided at step '2' is from 1 to 18 degrees Celsius, more preferably from 2 to 15 degrees Celsius, even more preferably from 3 to 12 degrees Celsius, still even more preferably from 4 to 10 degrees Celsius and still even more preferably from 5 to 8 degrees Celsius. It was observed that a temperature of the oil-continuous system within said more preferred ranges further improved the stability and reduced the batch-to-batch variation in stability of the W/O emulsions produced.

The temperature of the oil-continuous system should be in the range according to the invention (from 0 to 20 degrees Celsius) at the moment of contact with the solution comprising the lecithin and monoglyceride at step '3' of the process according to the invention.

Contacting the Emulsifier Solution with the Oil-Continuous System at Step '3'

At step '3' the solution provided at step '1' contacts the oil-continuous system provided at step '2'.

Preferably said contacting is done under conditions which favor rapid heat exchange between the solution provided at step '1' and the oil-continuous system provided at step '2'. It is believed that rapid cooling of the solution provided at step '1' improves the stability of the W/O emulsions made and reduces the batch-to-batch variability in quality.

For example, the solution provided at step '1' may be finely dispersed (e.g. sprayed) onto the surface of the oil-continuous system. For example, the solution provided at step '1' may be quickly dispersed into the oil-continuous system by use of a mixer (e.g. a dynamic mixer operating at 3000 rpm; Type BG100; supplier: Zoatec). For example, the solution provided at step '1' may be added via the said dynamic mixer operating at 3000 rpm, while the oil-continuous system is recirculated via a recirculation pump running at 3000 kg/h, and stirred by a high shear mixer at 960 rpm, in a time of about 50-65 seconds at a flow ratio emulsifier solution to oil-continuous system 1:10 to 1:25.

During the mixing at step '3' the average temperature of the oil-continuous system should preferably remain at most 20 degrees Celsius.

Oil-Continuous System Comprising Emulsifier Particles

In the process according to the invention at step '3' an edible oil-continuous system is formed comprising emulsifier particles comprising crystallized lecithin, monoglyceride or a combination of thereof. The volume size distribution of said emulsifier crystals is distinct in comparison with an oil-phase where to:
a) dissolved lecithin was added at a separate time and/or place as the dissolved monoglyceride (e.g. as two separate solutions);
b) a solution of lecithin and monoglyceride was added to the oil-phase, wherein the solution comprised a relatively large amount of oil (e.g. above 5 wt. % of total oil) in comparison to total amount of liquid oil;
c) the solution provided at step '1' was added to an oil-continuous system with a temperature of above 20 degrees Celsius (e.g. 25 degrees Celsius);

It is observed that use of an oil-continuous system comprising crystallized emulsifier particles comprising lecithin and monoglyceride having a certain volume size distribution improves the stability, and reduces the batch-to-batch variability in stability of W/O emulsions.

Therefore the invention also relates to an edible oil-continuous system comprising emulsifier particles comprising crystallized lecithin, monoglyceride or a combination of thereof, wherein at least 23% of the total volume of said particles is derived from particles having a diameter of at most 1 micrometer ($\mu$m). Preferably at least 25%, more preferably at least 27%, even more preferably at least 28%, still even more preferably at least 29%, still even more preferably at least 31%, still even more preferably at least 32%, still even more preferably at least 33% and still even more preferably at least 34% of the total volume of said particles is derived from particles having a diameter of at most 1 micrometer.

The emulsifier particles need not be excessively small and preferably at least 50% of the total volume of said particles is derived from particles having a diameter of at least 0.05 micrometer and even more preferably at least 0.18 micrometer.

According to the invention the volume distribution of the emulsifier particles sizes is based on laser diffraction methods wherein the spectra are converted to a particle volume distribution using Mie Theory.

Preferably at least 50 wt. %, more preferably 70 wt. % even more preferably 85 wt. % and still even more 95 wt. % of the weight of the emulsifier particles comprised by the oil-continuous system is derived from lecithin and monoglyceride.

It will be appreciated that preferably the oil-continuous system according to the invention is used in the process according to the invention.

Mixing at Step '4' to Provide a Water-in-Oil Emulsion

At step '4' all ingredients are present and/or any remaining ingredients are added (e.g. liquid oil, fat powder, water-phase, lecithin and monoglyceride) to provide a W/O emulsion according to the invention. For example, all ingredients may have already been present at step '3' in the process according to the invention.

The ingredients at step '4' are mixed to provide a W/O emulsion, using any suitable mixer known in the art of emulsion making.

Preferably the mixing at step '4' is high shear mixing, such as in a C-unit with an internal volume of from 0.5 to 2.5 liter; operating at from 1000 to 3000 rpm (rounds per minute) and more preferably operating at about 1500 rpm.

More preferably mixing at step '4' is done with a C-unit (supplier: Het Stempel) with an internal volume of 1.5 liter, with 1 row of 16 pins on the stator (outer wall) and 4 rows of either 8 or 9 pins (in total 34 pins) distributed over 4 times 90 degrees on the rotor.

The invention is now illustrated by the following non limiting examples.

EXAMPLES

Spreadability

Spreadibility, as measured in spreading score, is determined according to the following protocol. A flexible palette knife is used to spread a small amount of the spread on to fat free paper. The spreading screen is evaluated according to standardized scaling. A score of 1 represents a homogeneous and smooth product without any defects, a 2 refers to the same product but then with small remarks as slightly inhomogeneous or some vacuoles, a 3 refers to the level where defects become almost unacceptable, like loose moisture or coarseness during spreading. A score of 4 or 5 refers to unacceptable products, where the 4 refers to a product still having some spreading properties, but an unacceptable level of defects.

Water Droplet Size Distribution of W/O Emulsions

The normal terminology for Nuclear Magnetic Resonance (NMR) is used throughout this method. On the basis of this method the parameters D3,3 and exp(σ) of a lognormal water droplet size distribution can be determined. The D3,3 is the volume weighted mean droplet diameter and σ (e-sigma) is the standard deviation of the logarithm of the droplet diameter.

The NMR signal (echo height) of the protons of the water in a water-in-oil emulsion are measured using a sequence of 4 radio frequency pulses in the presence (echo height E) and absence (echo height E*) of two magnetic field gradient pulses as a function of the gradient power. The oil protons are suppressed in the first part of the sequence by a relaxation filter. The ratio (R=E/E*) reflects the extent of restriction of the translational mobility of the water molecules in the water droplets and thereby is a measure of the water droplet size. By a mathematical procedure —which uses the log-normal droplet size distribution—the parameters of the water droplet size distribution D3,3 (volume weighed geometric mean diameter) and a (distribution width) are calculated.

A Bruker magnet with a field of 0.47 Tesla (20 MHz proton frequency) with an air gap of 25 mm is used (NMR Spectrometer Bruker Minispec MQ20 Grad, ex Bruker Optik GmbH, DE).

Stevens Value

Stevens values indicates a products hardness or firmness. The Stevens value was measured with a Stevens penetrometer (Brookfield LFRA Texture Analyser (LFRA 1500), ex Brookfield Engineering Labs, UK) equipped with a stainless steel probe with a diameter of 6.35 mm and operated in "normal" mode. The probe is pushed into the product at a speed of 2 mm/s, a trigger force of 5 gram from a distance of 10 mm. The force required is read from the digital display and is expressed in grams.

Particle Size Distribution

The volume distribution of the particle sizes of emulsifier in liquid oil was analyzed using a HELOS laser diffraction sensor in combination with a Lixell Dispersion unit (Supplier: Sympatec GmbH, Germany). The Lixell Dispersion unit was fitted with a 0.2 millimeter cuvet. The machine was operated, and the samples prepared, according to Supplier protocols. To convert the measured diffraction spectra into a volume distribution of the particles Mie Theory was applied.

W/O Emulsion Production

The compositions of the W/O emulsion used in the experiments are set out in Table 1.

TABLE 1

Composition of W/O emulsions of Example 1 to 4 and Comparative A to C; numbers represent wt. %.

| | Example 1/ Comparative A | Example 2/ Comparative B | Example 3, 4/ Comparative C |
|---|---|---|---|
| FAT-PHASE | | | |
| [1,2]Fat powder | 13 | 13 | 10 |
| [1]Palm kernel oil | 7 | 7 | 6 |
| [1,4]Dimodan RT | 0.31 | 0.33 | 0.5 |
| [1,5]Dimodan HP | 0.47 | 0.50 | 0.5 |
| [1,6]Sunlec M | 0.31 | 0.33 | — |
| [1,6]Bolec ZT | — | — | 0.67 |
| [1]Rapeseed oil | Balance | Balance | Balance |
| [7]WATER-PHASE | | | |
| [8]NaCL | 0.71 | 0.69 | 2.5 |
| [8,9]Colflo67 | 2.2 | 2.1 | — |
| [8,10]Purity SUV | — | — | 4.29 |
| [8]Butter milk protein | 0.07 | 0.07 | — |
| [8]Tricalciumphosphate | — | — | 3 |

TABLE 1-continued

Composition of W/O emulsions of Example 1 to 4 and Comparative A to C; numbers represent wt. %.

| | Example 1/ Comparative A | Example 2/ Comparative B | Example 3, 4/ Comparative C |
|---|---|---|---|
| [8]Potassium sorbate | 0.22 | 0.21 | 0.14 |
| [8,11]EDTA | | | |
| [8]Water | Balance | Balance | Balance |
| W/O emulsions: | | | |
| Total Fat-phase | 35 | 32 | 30 |
| Total Water-phase | 65 | 68 | 70 |

[1]wt. % based on total fat.
[2]The fat powder was obtained using a supercritical melt micronisation process similar to the process described in Particle formation of ductile materials using the PGSS technology with supercritical carbon dioxide, P. Münüklü, Ph.D. Thesis, Delft University of Technology, 16 Dec. 2005, Chapter 4, pp. 41-51. The fat powder consisted of an interesterified mixture of 65% dry fractionated palm oil stearin with an Iodine Value of 14 and 35% palm kernel oil.
[3]Dimodan RT: molecularly distilled mono-/diglyceride mixture derived from partially hardened rapeseed oil (90% mono-glyceride) ex Danisco DK.
[4]Dimodan HP: molecularly distilled mono-/diglyceride mixture derived from fully hardened palm oil (90% mono-glyceride) ex Danisco DK.
[5]Sunlec M (Supplier: Unimills B.V., the Netherlands) is lecithin comprising 36 wt. % phosphatidylcholine, 14 wt. % phosphatidylethanolamine and 35 wt. % phosphatidylinositol.
[6]Bolec ZT (Supplier: Unimills B.V., the Netherlands) is lecithin comprising 37 wt. % phosphatidylcholine, 19 wt. % phosphatidylethanolamine and 22 wt. % phosphatidylinositol.
[7]The pH of the water-phase was adjusted to 4.8 using lactic acid.
[8]wt. % based on total water-phase.
[9]Colflo 67: waxy corn starch, modified using cross-linking by acetic anhydride and substituted by adipic acid anhydride (Supplier: Ingredion, U.K.).
[10]Purity SUV: tapioca starch, modified using cross-linking by phosphoric acid (Supplier: Ingredion, U.K.).
[11]EDTA: Ethylenediaminetetraacetic acid.

Spreads Production Process

All water-phase ingredients were dissolved at a temperature of 60 degrees Celsius and the water-phase was subsequently pasteurized. The water-phase was pumped through a tubular heat exchanger and cooled to 6-8 degrees Celsius just before mixing with the fat mixture to provide the water feed.

Example 1, Example 2

In the manufacture of Example 1 and Example 2, all of the Dimodan RT, Dimodan HP and Sunlec M were dissolved in 2.5 wt. % of liquid oil (based on the total amount of liquid oil) by heating the mixture to about 70 degrees Celsius.

The emulsifier solution comprising dissolved monoglyceride and lecithin was added via the dynamic mixer placed in the recirculation loop, to the remainder of the liquid oil and mixed using a high shear mixer operating at 960 rpm under recirculation at 3000 kg/h. In case of Example 1 and Example 2 the temperature of the oil when (i.e. just before) the emulsifiers were added was about 13 to 14 degrees Celsius.

Next the fat powder, pre-cooled to 5 degrees Celsius, was added. The oil, emulsifiers, and the fat powder were homogenized (operating conditions: recirculation speed 3000 kg/h, dynamic mixer 3000 rpm, high shear mixer: 960 rpm) and degassed under vacuum (100 mbar) using a dispersion unit (Supplier: Zoatec) to provide the fat feed.

Comparative a, Comparative B

In the manufacture of Comparative A and Comparative B, all of the Dimodan RT and Dimodan HP were dissolved in 2.5 wt. % of liquid oil (based on the total amount of liquid oil) by heating the mixture to about 70 degrees Celsius.

A separate solution was made comprising the all of the dissolved Sunlec M in 2.5 wt. % of liquid oil (based on the total amount of liquid oil) by heating the mixture to about 70 degrees Celsius.

The solution comprising dissolved lecithin was added to the remainder of the liquid oil via a dynamic mixer placed in a recirculation loop, and mixed using a high shear mixer operating at 960 rpm under recirculation at 3000 kg/h. The temperature of the oil when (i.e. just before) the lecithin was added was about 13 to 14 degrees Celsius. Next, the monoglyceride solution was added via the dynamic mixer placed in the recirculation loop to the lecithin containing liquid oil and mixed.

Next the fat powder, pre-cooled to 5 degrees Celsius, was added. The oil, emulsifiers, and the fat powder were homogenized (operating conditions: recirculation speed 3000 kg/h, dynamic mixer 3000 rpm, high shear mixer: 960 rpm) and degassed under vacuum (100 mbar) using a dispersion unit (Supplier: Zoatec) to provide the fat feed.

Example 3, Example 4

In the manufacture of Example 3 and 4, an emulsifier solution comprising all of the Dimodan RT, Dimodan HP and Bolec ZT was made by dissolving the emulsifiers in 2.5 wt. % of liquid oil (based on the total amount of liquid oil) by heating the mixture to about 70 degrees Celsius.

The emulsifier solution comprising dissolved monoglyceride and lecithin was added via the dynamic mixer placed in the recirculation loop, to the remainder of the liquid oil and mixed using a high shear mixer operating at 960 rpm under recirculation at 3000 kg/h. In case of Example 3, the temperature of the oil when (i.e. just before) the emulsifiers were added was about 13 to 14 degrees Celsius. In case of Example 4, the temperature of the oil was about 7 degrees Celsius.

The particle size distribution of the emulsifier in the liquid oil was measured for Example 3 and 4 (Table 3).

Next the fat powder, pre-cooled to 5 degrees Celsius, was added. The oil, emulsifier mixture and fat powder were homogenized (operating conditions: recirculation speed 3000 kg/h, dynamic mixer 3000 rpm, high shear mixer: 960 rpm) and degassed under vacuum (100 mbar) using a dispersion unit (Supplier: Zoatec) to provide the fat feed.

Comparative C

In the manufacture of Comparative C, the all of the Dimodan RT and Dimodan HP were dissolved in 2.5 wt. % amount of liquid oil (based on the total amount of liquid oil) by heating the mixture to about 70 degrees Celsius.

A separate solution was made comprising all of the dissolved Bolec ZT in 2.5 wt. % of liquid oil (based on the total amount of liquid oil), by heating to about 50 degrees Celsius.

The solution comprising dissolved lecithin was added to the remainder of the liquid oil via the dynamic mixer placed in the recirculation loop, and mixed using a high shear mixer operating at 960 rpm under recirculation at 3000 kg/h. The temperature of the oil when (i.e. just before) the lecithin was added was about 13 to 14 degrees Celsius. Next, the monoglyceride solution was added via the dynamic mixer placed in the recirculation loop to the lecithin containing liquid oil and mixed.

The particle size distribution of the emulsifier in the liquid oil was measured (Table 3).

Next the fat-powder, pre-cooled to 5 degrees Celsius, was added. The oil, emulsifier mixture and fat-powder were homogenized (operating conditions: recirculation speed 3000 kg/h, dynamic mixer 3000 rpm, high shear mixer: 960 rpm) and degassed under vacuum (100 mbar) using a dispersion unit (Supplier: Zoatec) to provide the fat feed.

Mixing the Fat- and Water Feed

For all Examples and Comparatives, the prepared fat feed was kept in a tank thermo-stated at 14 degrees Celsius.

The fat feed and the water feed were pumped via a junction point into C-unit (Supplier: Het Stempel) with an internal volume of 1.5 liter, with 1 row of 16 pins on the stator (outer wall) and 4 rows of either 8 or 9 pins (in total 34 pins) distributed over 4 times 90 degrees on the rotor.

The C-unit was thermo-stated at 12 degrees Celsius and operated at about 1600 rpm (Example 1 and Comparative A) or about 1250 rpm (Example 2, 3, 4 and Comparative B and C).

The resulting spreads (W/O emulsions) were collected into 250 ml tubs and stored at 5 degrees Celsius for one week until further treated and/or measured.

Results

The droplet size distribution (D3,3 and e-sigma), Stevens value and spreading score of the manufactured spreads were measured after the spreads had been stored for one week at 5 degrees Celsius Cone week at 5 degrees Celsius', Table 2 and Table 4).

After said storage at 5 degrees Celsius for one week, samples of the spreads of Example 1, Example 2, Comparative A and Comparative B were subjected to different heat-cycle tests:

In the 'UMA-cycle' spreads were stored for 3 days at 15 degrees Celsius, followed by 1 day at degrees Celsius before being measured (After UMA-cycle, Table 2).

In the 'B1-cycle' spreads were stored for 2 days at 25 degrees Celsius, followed by 4 days at degrees Celsius, followed by 1 say at 10 degrees Celsius before being measured (After B1-cycle, Table 2).

In the 'B2-cycle' spreads were first treated as in the B1-cycle followed by three consecutive cycles of: being stored for 1 day at 25 degrees Celsius, followed by 1 day at 5 degrees Celsius. Finally the spreads were stored for 1 day at 10 degrees Celsius before being measured (After B2-cycle, Table 2).

In the 'C1-cycle' spreads were stored for 2 days at 30 degrees Celsius, followed by 4 days at degrees Celsius, followed by 1 day at 10 degrees Celsius before being measured (After C1-cycle, Table 2).

In the 'C2-cycle' spreads were first treated as in the B1-cycle followed by three consecutive cycles of: being stored for 1 day at 25 degrees Celsius, followed by 1 day at 5 degrees Celsius. Finally the spreads were stored for 1 day at 10 degrees Celsius before being measured (After C2-cycle, Table 2).

TABLE 2

Analysis of spreads after production and heat-cycle treatment.

| | Example 1 | Comparative A | Example 2 | Comparative B |
|---|---|---|---|---|
| One week at 5 degrees Celsius | | | | |
| D3, 3 | 4.95 | 4.15 | 4.46 | 5.8 |
| e-sigma | 1.87 | 1.92 | 1.91 | 2.06 |
| Stevens value | 24 | 22 | 24 | 21 |
| Spreadability score | n.d. | n.d. | n.d. | n.d. |
| Spreads analysis after UMA-cycle | | | | |
| D3, 3 | 4.40 | 5.90 | 5.40 | 6.80 |
| e-sigma | 1.97 | 1.70 | 1.70 | 1.70 |
| Stevens value | 149 | 146 | 145 | 130 |
| Spreadability score | 1 | 2 | 2 | 2 |

TABLE 2-continued

Analysis of spreads after production and heat-cycle treatment.

| | Example 1 | Comparative A | Example 2 | Comparative B |
|---|---|---|---|---|
| Spreads analysis after B1-cycle | | | | |
| D3, 3 | 13.90 | 16.00 | 14.70 | n.m. |
| e-sigma | 2.70 | 2.70 | 2.70 | n.d. |
| Stevens value | 129 | 118 | 119 | 105 |
| Spreadability score | 1 | 2 | 2 | 5 |
| Spreads analysis after B2-cycle | | | | |
| D3, 3 | 11.40 | 17.00 | 16.00 | n.m. |
| e-sigma | 2.60 | 2.80 | 2.90 | n.d. |
| Stevens value | 124 | 128 | 131 | n.d. |
| Spreadability score | 2 | 2 | 2-3 | 5 |
| Spreads analysis after C1-cycle | | | | |
| D3, 3 | 15.00 | n.m. | n.m. | n.m. |
| e-sigma | 2.80 | n.d. | n.d. | n.d. |
| Stevens value | 129 | 103 | 108 | n.d. |
| Spreadability score | 2 | 5 | 5 | 5 |
| Spreads analysis after C1-cycle | | | | |
| D3, 3 | 18.00 | n.m. | n.m. | n.m. |
| e-sigma | 3.10 | n.d. | n.d. | n.d. |
| Stevens value | 123 | n.d. | n.d. | n.d. |
| Spreadability score | 2 | 5 | 5 | 5 | n.d.: not determined;
n.m. not measurable (i.e. above upper-limit of measuring equipment);

TABLE 3

Emulsifier particle size distribution in oil-phase of Example 3, Example 4 and Comparative C.

| | Example 3 | Example 4 | Comparative C |
|---|---|---|---|
| [1]% particles in size range 0.18-1 µm | 31 | 34 | 20 |

[1]% based on total volume of particles

TABLE 4

Analysis of spreads after production of Example 3, Example 4 and Comparative C.

| | Example 3 | Example 4 | Comparative C |
|---|---|---|---|
| One week at 5 degrees Celsius | | | |
| D3, 3 | 6.22 | 6.33 | 7.79 |
| e-sigma | 2.19 | 2.12 | 2.50 |
| Stevens value | 13 | 11 | 10 |

Clearly the W/O emulsions made in the process according to the invention have an improved stability compared to emulsions not made according to the invention.

In general it is observed that the batch-to-batch variation of the stability of the W/O emulsions produced according to the process of the invention is reduced when compared to W/O emulsions made not according to the process of the invention. For example, it was specifically observed that the batch-to-batch variation in stability of the W/O emulsions produced according to comparative A can be quite significant (data not shown). For example, the variation in stability between the W/O emulsions produced according to Example 3 and Example 4 is quite small, as can be seen in Table 4 (e.g. similar D3,3 and e-sigma).

The invention claimed is:

1. A process for manufacturing a water-in-oil emulsion, comprising 10 to 85 wt. % of liquid oil, 0.5 to 50 wt. % of fat powder comprising hardstock fat, 10 to 85 wt. % of a water-phase, and 0.005 to 5 wt. % of lecithin, comprising the steps of:
   1) providing a solution of at most 5 wt. % of the liquid oil, based on the total amount of liquid oil, comprising at least 50 wt. % of dissolved lecithin, based on the total amount of lecithin; and at least 50 wt. % of dissolved monoglycerides, based on the total amount of monoglycerides; wherein the temperature of the solution is at least 50° C.;
   2) providing an oil-continuous system comprising at least 75 wt. % of the liquid oil, based on the total amount of liquid oil, wherein the system has a temperature of from 0 to 20° C.;
   3) contacting the solution provided at step '1' with the system provided at step '2' to form a mixture; and
   4) mixing the mixture provided at step '3' to provide a water-in-oil emulsion;
   wherein the water-in-oil emulsion contains emulsifier particles comprising crystallized lecithin, monoglycerides, or a combination of thereof, and at least 23% of the total volume of said emulsifier particles comprises particles having a diameter of at most 1 micrometer.

2. The process of claim 1, wherein the amount of lecithin is from 0.01 to 3 wt. %.

3. The process of claim 1, wherein the lecithin comprises at least 30 wt. % of phosphatidylcholine, based on the weight of total lecithin.

4. The process of claim 1, wherein the amount of monoglyceride is from 0.01 to 3 wt. %.

5. The process of claim 1, wherein the monoglyceride comprises from 10 to 90 wt. % of saturated fatty acid residues, based on the total weight of the monoglyceride.

6. The process of claim 1, wherein the amount of fat powder comprising hardstock fat is from 1 to 20 wt. %.

7. The process of claim 1, wherein the fat powder is micronized fat powder.

8. The process of claim 1, wherein the amount of total fat is from 15 to 50 wt. %.

9. The process of claim 1, wherein the solution provided at step '1' comprises at most 4.5 wt. % of liquid oil, based on the total amount of the liquid oil.

10. The process of claim 1, wherein the oil-continuous system provided at step '2' comprises at least 80 wt. % of the liquid oil, based on the total amount of the liquid oil.

11. The process of claim 1, wherein the oil-continuous system provided at step '2' comprises at most 75 wt. % of the water-phase, based on the total amount of the water-phase.

12. The process of claim 1, wherein the temperature of the oil-continuous system provided at step '2' is from 1 to 18° C.

13. The process of claim 1, wherein the temperature of the solution provided at step 1 is at least 65° C.

14. The process of claim 1, wherein the temperature of the solution provided at step 1 is from 70 to 95° C.

15. The process of claim 1, wherein the temperature of the oil-continuous system provided at step 2 is from 3 to 12° C.

16. The process of claim 1, wherein the temperature of the solution provided at step 1 is at least 65° C. and the temperature of the oil-continuous system provided at step 2 is from 3 to 12° C.

17. The process of claim 1, wherein the temperature of the solution provided at step 1 is at least 65° C. and the temperature of the oil-continuous system provided at step 2 is from 5 to 8° C.

18. The process of claim 1, wherein the fat powder and any other remaining ingredients are added in whole at step '2', step '3' or step '4,' or added in parts in any combination at step '2', step '3' and/or step '4'.

19. The process of claim 1, wherein at least 32% of the total volume of said emulsifier particles comprises particles having a diameter of at most 1 micrometer.

20. The process of claim 1, wherein at least 50% of the total volume of said emulsifier particles comprises particles having a diameter of at least 0.18 micrometers.

* * * * *